(12) United States Patent
Mendlovic et al.

(10) Patent No.: US 6,343,307 B1
(45) Date of Patent: Jan. 29, 2002

(54) SYNTHESIS OF LIGHT BEAMS

(75) Inventors: David Mendlovic; Zeev Zalevsky; Gal Shabtay; Uriel Levy, all of Petach Tikva; Emanuel Marom, Tel Aviv; Naim Konforti, Holon, all of (IL)

(73) Assignee: Civcom Inc., Wilmington, DE (US)

( * ) Notice: Subject to any disclaimer, the term of this patent is extended or adjusted under 35 U.S.C. 154(b) by 0 days.

(21) Appl. No.: 09/277,322

(22) Filed: Mar. 26, 1999

(51) Int. Cl.[7] .............................. G06G 7/02; G06E 3/00; G06E 1/04
(52) U.S. Cl. ...................... 708/819; 708/191; 708/816
(58) Field of Search ................................ 708/816, 819, 708/191

(56) References Cited

U.S. PATENT DOCUMENTS 4,290,112 A * 9/1981 Baumann et al. ............ 708/816
4,351,589 A * 9/1982 Chavel et al. ............... 708/191

OTHER PUBLICATIONS

David Mendlovic, et al., "Encoding Technique for Design of Zero–Order (on–axis) Fraunhofer Computer–Generated Holograms", Applied Optics, vol. 36, No. 32, Nov. 10, 1997, pp. 8427–8434.

J. Durin, "Exact Solutions for Nondiffracting Beams. I. The Scalar", Opt. Soc. Am. A. vol. 4, No. 4, Apr. 1987, pp. 651–654.

Antti Vasara, et al., "Realization of General Nondiffracting Beams with Computer–Generated Holograms", J. Opt. Soc. Am. A. vol. 6, No. 11, Nov. 1989, pp. 1748–1754.

F. Gori, et al., "Bessel–Gauss Beams, Optics Communications", vol. 64, No. 6, Dec. 15, 1987, pp. 491–495.

Joseph Rosen, "Synthesis of Nondiffracting Beams in Free Space", Optics Letters, vol. 19, No. 6, Mar. 15, 1994, pp. 369–371.

Rafael Piestun, et al., "Wave Fields in Three Dimensions: Analysis and Synthesis", J. Opt. Soc. Am. A. vol. 13, No. 9, Sep. 1996, pp. 1837–1848.

David Mendlovic, et al., "High–Efficienty Arbitrary Array Generator", Applied Optics, vol. 35, No. 35, Dec. 10, 1996, pp. 6875–6880.

Zeev Zalevsky, et al., "Gerchberg–Saxton Algorithm Applied in the Fractional Fourier or the Fresnel Domain", Optics Letters, vol. 21, No. 12, Jun. 15, 1996, pp. 842–844.

* cited by examiner

Primary Examiner—Tan V. Mai
(74) Attorney, Agent, or Firm—Abelman, Frayne & Schwab

(57) ABSTRACT

A method and system for synthesizing a desired light beam including calculating a two-dimensional light filter for an optical element, the two-dimensional light filter being such that the optical element produces under free space propagation, in response to illumination thereof, a three-dimensional light distribution that approximates the light distribution of the desired light beam, and illuminating the optical element.

59 Claims, 5 Drawing Sheets

FIGURE 4A   FIGURE 4B
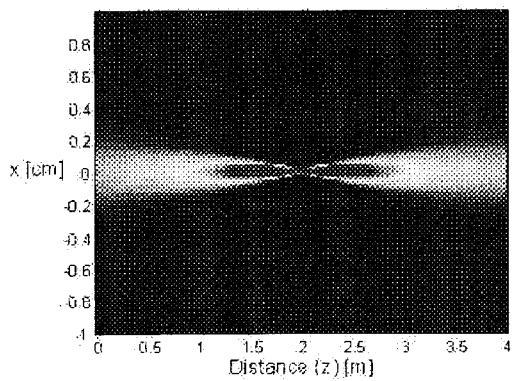 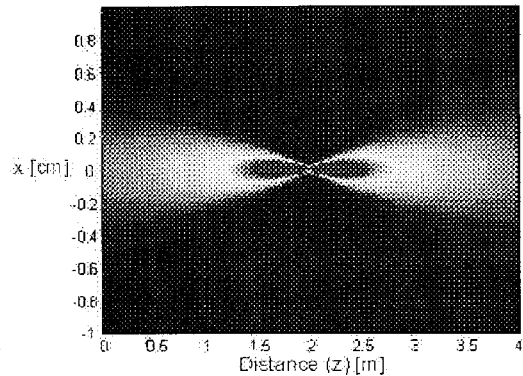
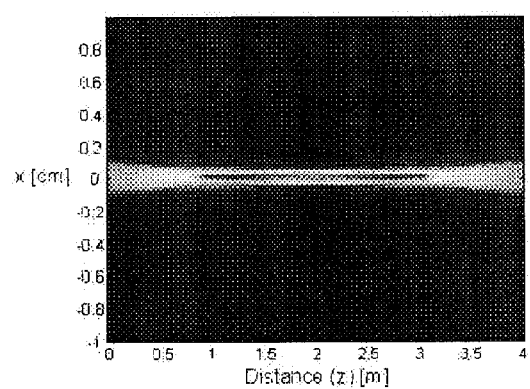
FIGURE 4C
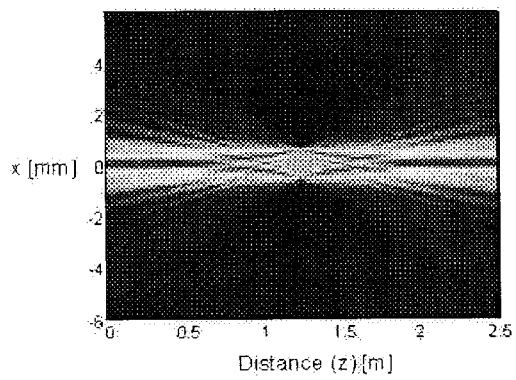 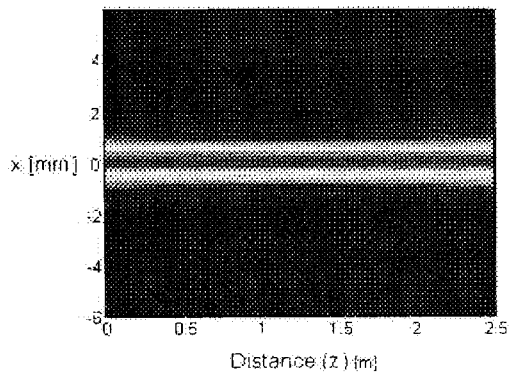
FIGURE 5A   FIGURE 5B

SYNTHESIS OF LIGHT BEAMS

FIELD OF THE INVENTION

The present invention relates to the field of optics.

BACKGROUND OF THE INVENTION

Synthesis of three-dimensional light beams is an essential part of scanning devices, plotters, light pointers, optical communication modules and super-resolution devices. Today, light beams are generated by use of computer-generated holograms, and by fabrication of diffractive optical elements.

Known methods for synthesizing light beams suffer from divergence of shape over large distances. As a result, optical scanners are limited to short distances in their operation. This has practical disadvantages. For example, it implies that optical bar code readers must be located sufficiently close to the bar code being read in order to read it properly. If a teller does not move a bar code reader close enough to the product being read, the reader does not properly register the bar code that is on the product. Although the teller can be far from the scanner, the scanning region itself must be sufficiently short in order to properly read a bar code.

Several approaches for generating "non-diffracting" beams, i.e., beams which preserve their spatial properties while propagating along a transverse axis, have been developed over the past 20 years. One such approach uses an exact non-diffractive solution of the scalar wave equation, referred to as a "Bessel beam." However, the Bessel beam is ideal in that it is unbounded and requires an infinite amount of energy for its generation, and, as such, its use has limited practical value. A reference for this approach is J. During, Exact solutions of nondiffracting beams, J. Optical Society of America A 4, 1987, pages 651–654, the contents of which are hereby incorporated by reference.

Another such approach uses plane waves, which are also ideal non-diffractive beams. However, plane waves are also unbounded and require an infinite amount of energy for their generation, and, as such, their use has limited practical value.

Although the use of the abovementioned ideal non-diffracting beams is impractical, it is possible to generate approximations to non-diffractive beams by means of diffractive optical elements. A reference for this is A. Vasara, J. Turunen and A. T. Friberg, Realization of general non-diffracting beams with computer generated holograms, J. Optical Society of America A 6, 1989, pages 1748–1754, the contents of which are hereby incorporated by reference.

Yet another approach to generating non-diffracting beams is to multiply the Bessel beam by a Gaussian profile, producing what is referred to as a "Gauss-Bessel beam." The Gauss-Bessel beam carries a finite amount of energy, and despite its diffraction sensitivity due to the Gaussian profile, its diffraction spread is small as compared with typical Gaussian beams. A reference for this approach is F. Gori, G. Guattari and C. Padovani, Bessel-Gauss beams, Optical Communications 64, 1987, page 491, the contents of which are hereby incorporated by reference.

A further approach to generating non-diffracting beams uses an iterative technique referred to as Projection onto Constraint Sets (POCS). POCS operates by performing free space propagation of an incoming plane wave through a diffractive light filter, and forward through a series of parallel planes along an axis transverse thereto. At each plane of the series of parallel planes, the light distribution obtained by free space propagation is modified according to desired constraints, and then the modified light distribution is propagated through free space to a next parallel plane, until the propagation reaches the last of the parallel planes. After the light distribution is propagated to the last of the parallel planes, it is then propagated along the transverse axis back to the light filter, using backward free space propagation. Successive iterations of the POCS algorithm then further propagate the resulting light distribution forward through each of the parallel planes, and then backward back to the filter, as described hereinabove. The sequence of light distributions that is generated in successive iterations typically tends to stabilize at a single distribution, and the POCS iterations are terminated when a prescribed convergence criterion for the sequence of generated light distributions is met.

References for the iterative POCS approach are J. Rosen, Synthesis of nondiffracting beams in free space, Optical Letters 19, 1994, pages 369–371, and R. Piestun, B. Spektor and J. Shamir, Wave fields in three dimensions: analysis and synthesis, J. Optical Society of America A 13, 1996, page 1837, the contents of both of which are hereby incorporated by reference.

Many approaches to generating non-diffracting beams involve complex amplitude light distribution functions. Such light distribution functions can be generated using a single phase-only filter, as described in D. Mendlovic, G. Shabtay, U. Levy, Z. Zalevsky and E. Marom, Encoding techniques for the design of zero order (on Axis) Fraunhofer computer generated holograms, Applied Optics 36, 1997, pages 8427–8434, the contents of which are hereby incorporated by reference. Alternatively, complex amplitude light distributions can also be generated using two phase-only filters separated by a propagation distance, as described in D. Mendlovic, Z. Zalevsky, G. Shabtay and E. Marom, High efficiency arbitrary array generator, Applied Optics 35, 1986, pages 6875–6880, the contents of which are hereby incorporated by reference. Use of two phase-only filters typically generates complex amplitude light distributions with higher efficiency, as compared with use of a single phase-only filter. The above approach of using two phase-only filters is based on application of an algorithm of Gerchberg-Saxton to a Fresnel domain, as described in Z. Zalevsky, D. Mendlovic and A. W. Lohmann, Gerchberg-Saxton algorithm applied in the fractional Fourier or the Fresnel domain, Optical Letters 21, 1996, pages 842–844, the contents of which are hereby incorporated by reference.

SUMMARY OF THE INVENTION

The present invention provides methods and systems for synthesizing light beams with non-diffractive characteristics. Specifically, it can be used to synthesize elongate beams useful in optical scanning devices that operate over larger distance ranges than conventional beams.

The present invention provides both a direct analytical approach and an indirect iterative approach for approximating desired light beams. The analytical approach is guaranteed to produce optimal light beams in a mean square error sense, as described hereinbelow.

The present invention has advantageous utility when used in conjunction with optical scanning devices. It can be used to synthesize elongate beams that operate over larger distance ranges than conventional beams. It can also be used to synthesize beams within prescribed regions of interest.

The present invention also has advantageous utility when used for illuminating targets at a plurality of distances. By controlling the three-dimensional characteristics of a light beam, the present invention can be used to generated beams with elongated focus and point targets at a plurality of locations.

Based on an analogy between diffractive free space propagation and dispersion within linear fibers, the present invention also has advantageous utility when used in conjunction with optical communication systems. It can be used to synthesize time-varying one-dimensional beams in optical fibers containing multiple exit points where information may be extracted.

There is thus provided in accordance with a preferred embodiment of the present invention a method for synthesizing a desired light beam including calculating a two-dimensional light filter for an optical element, the two-dimensional light filter being such that the optical element produces under free space propagation, in response to illumination thereof, a three-dimensional light distribution that approximates the light distribution of the desired light beam, and illuminating the optical element.

There is further provided in accordance with a preferred embodiment of the present invention a method for synthesizing a desired light beam including calculating a plurality of phase-only light filters for a respective plurality of optical elements, the plurality of phase-only light filters being such that the plurality of optical elements when mounted in series produce under free space propagation, in response to illumination thereof, a three-dimensional light distribution that approximates the light distribution of the desired light beam, and illuminating the plurality of optical elements.

There is still further provided in accordance with a preferred embodiment of the present invention a system for synthesizing a desired light beam including a processor calculating a two-dimensional light filter for an optical element, the two-dimensional light filter being such that the optical element produces under free space propagation, in response to illumination thereof, a three-dimensional light distribution that approximates the light distribution of the desired light beam, and an optical element filtering incoming light according to the two-dimensional light filter.

There is additionally provided in accordance with a preferred embodiment of the present invention a system for synthesizing a desired light beam including a processor calculating a two-dimensional light filter for an optical element, the two-dimensional light filter being such that the optical element produces under free space propagation, in response to illumination thereof, a three-dimensional light distribution that approximates the light distribution of the desired light beam, and a plurality of optical elements with phase-only light filters mounted in series which, when used in combination, filter incoming light according to the two-dimensional light filter.

There is further provided in accordance with a preferred embodiment of the present invention an elongated focused light beam for use within an optical scanner, made by the process of calculating a two-dimensional light filter for an optical element, the two-dimensional light filter being such that the optical element produces under free space propagation, in response to illumination thereof, a three-dimensional light distribution that approximates the light distribution of a desired light beam, and illuminating the optical element.

There is still further provided in accordance with a preferred embodiment of the present invention an elongated focused light beam for use within an optical scanner, made by the process of calculating a plurality of phase-only light filters for a respective plurality of optical elements, the plurality of phase-only light filters being such that the plurality of optical elements when mounted in series produce under free space propagation, in response to illumination thereof, a three-dimensional light distribution that approximates the light distribution of a desired light beam, and illuminating the plurality of optical elements.

There is additionally provided in accordance with a preferred embodiment of the present invention an article of manufacture including one or more computer readable media that embody a program of instructions for synthesizing a desired light beam, wherein the program of instructions, when executed by a processor, causes the processor to calculate a two-dimensional light filter for an optical element, the two-dimensional light filter being such that the optical element produces under free space propagation, in response to illumination thereof, a three-dimensional light distribution that approximates the light distribution of the desired light beam.

There is further provided in accordance with a preferred embodiment of the present invention a method for synthesizing a desired time-varying light distribution propagating along an optical fiber, including the steps of calculating a time-dependent light source which produces, under propagation along an optical fiber, a time-varying light distribution that best approximates the desired time-varying light distribution with respect to a prescribed error metric, as compared with time-varying light distributions produced by other time-dependent light sources, and propagating the time-dependent light source along the optical fiber.

There is still further provided in accordance with a preferred embodiment of the present invention a method for synthesizing a desired time-varying light distribution propagating along an optical fiber, including the steps of choosing a candidate time-dependent light source for propagation along an optical fiber, deriving a plurality of forward time-dependent light sources at a respective plurality of locations along the optical fiber, by applying forward dispersion to the candidate time-dependent light source, modifying the plurality of forward time-dependent light sources, further deriving a plurality of backward time-dependent light sources by applying backward dispersion to each of the plurality of modified forward time-dependent light sources, producing a modified candidate time-dependent light source by taking an average of the plurality of backward time-dependent light sources, and propagating the modified candidate time-dependent light source along the optical fiber.

There is additionally provided in accordance with a preferred embodiment of the present invention a system for synthesizing a desired time-varying light distribution propagating along an optical fiber, including an acousto-optic modulator creating a time-dependent light source which produces, under propagation along an optical fiber, a time-varying light distribution that best approximates the desired time-varying light distribution with respect to a prescribed error metric, as compared with time-varying light distributions produced by other time-dependent light sources, and an optical fiber propagating the time-dependent light source.

There is further provided in accordance with a preferred embodiment of the present invention a system for synthesizing a desired time-varying light distribution propagating along an optical fiber, including a dispersion unit applying forward dispersion to a candidate time-dependent light source, producing a plurality of forward time-dependent light sources at a respective plurality of locations along the optical fiber, and applying backward dispersion to modified forward time-dependent light sources, producing a plurality of backward time-dependent light sources, a modification unit modifying the plurality of forward time-dependent light sources, producing the modified forward time-dependent light sources, an averaging unit generating an average of the plurality of backward time-dependent light sources, producing a modified candidate time-dependent light source, and an optical fiber propagating the modified candidate time-dependent light source.

BRIEF DESCRIPTION OF THE DRAWINGS

The present invention will be more fully understood and appreciated from the following detailed description, taken in conjunction with the drawings in which:

FIGS. 4A, 4B and 4C are illustrations of cross-sections of an amplitude profile of a desired beam, a conventional Gaussian beam and a beam obtained using an analytical method in accordance with a preferred embodiment of the present invention, respectively;

FIGS. 5A and 5B are illustrations of cross-sections of an amplitude profile of a conventional beam having a rectangular aperture in its middle range, and a beam obtained using an analytical method in accordance with a preferred embodiment of the present invention, respectively;

DETAILED DESCRIPTION OF A PREFERRED EMBODIMENT

The present invention concerns the synthesis of light beams. It overcomes limitations that restrict the applicability of optical readers to short distances by synthesizing light beams that maintain their shape over a long distance range, and do not diverge as fast as light beams generated by prior art methods.

In a preferred embodiment, the present invention calculates a two-dimensional light filter for a diffractive optical element, the light filter being such that the diffractive optical element produces, under free space propagation, a desired three-dimensional light distribution, or an approximation to a desired three-dimensional light distribution, in response to an incoming planar light wave. The light filter calculated in the preferred embodiment is such that no other light filter can produce a better approximation to the desired three-dimensional light distribution using a single diffractive optical element, in the sense of least square error. Even when the desired three-dimensional light distribution does not satisfy the classical wave equation, the present invention nevertheless produces the filter that generates the best approximation to the desired three-dimensional distribution in the least-squares error sense, among all two-dimensional light filters.

Notation

In order to describe preferred embodiments of the present invention, certain mathematical notation is used for the sake of definiteness and clarity. Specifically:

x, y and z are used to denote real-valued reference coordinates in a three-dimensional frame of reference;

i denotes the classical complex number with unit intensity and 90° phase angle;

$\mu$ and $\eta$ denote coordinates in a frequency domain when a Fourier transform is applied to a two-dimensional spatial function;

$\lambda$ denotes a wavelength for a light wave;

f(x, y) is used to denote a complex-valued two-dimensional light filter for a diffractive optical element that is illuminated by an incoming planar wave;

u(x, y, z) is used to denote a desired complex-valued three-dimensional light distribution, corresponding to the light distribution of a desired light beam;

$h_z(x, y)$ is used to denote a complex-valued impulse response function for propagation of planar light in free space through a distance z in a direction transverse to the plane of the light;

w(x, y, z) denotes a weight function;

$\circledx$ denotes the two-dimensional convolution operator, given by $$(f \circledx g)(x,y) = \int\int f(s,t)g(x-s, y-t) ds \cdot dt;$$

and

F, $H_z$ and U denote the respective two-dimensional Fourier transforms (relative to the x and y coordinates) of f, $h_z$ and u. Specifically, F is related to f by $$F(\mu,\eta) = \int\int f(x,y) \exp(-2\pi i(\mu x + \eta y)) dx \cdot dy,$$

with a similar relationship between $H_z$ and $h_z$ and between U and u. Additional variables used in preferred embodiments are further introduced hereinbelow.

Mathematical Formulation of the Optimality Condition for f (x, y)

Figure 1:
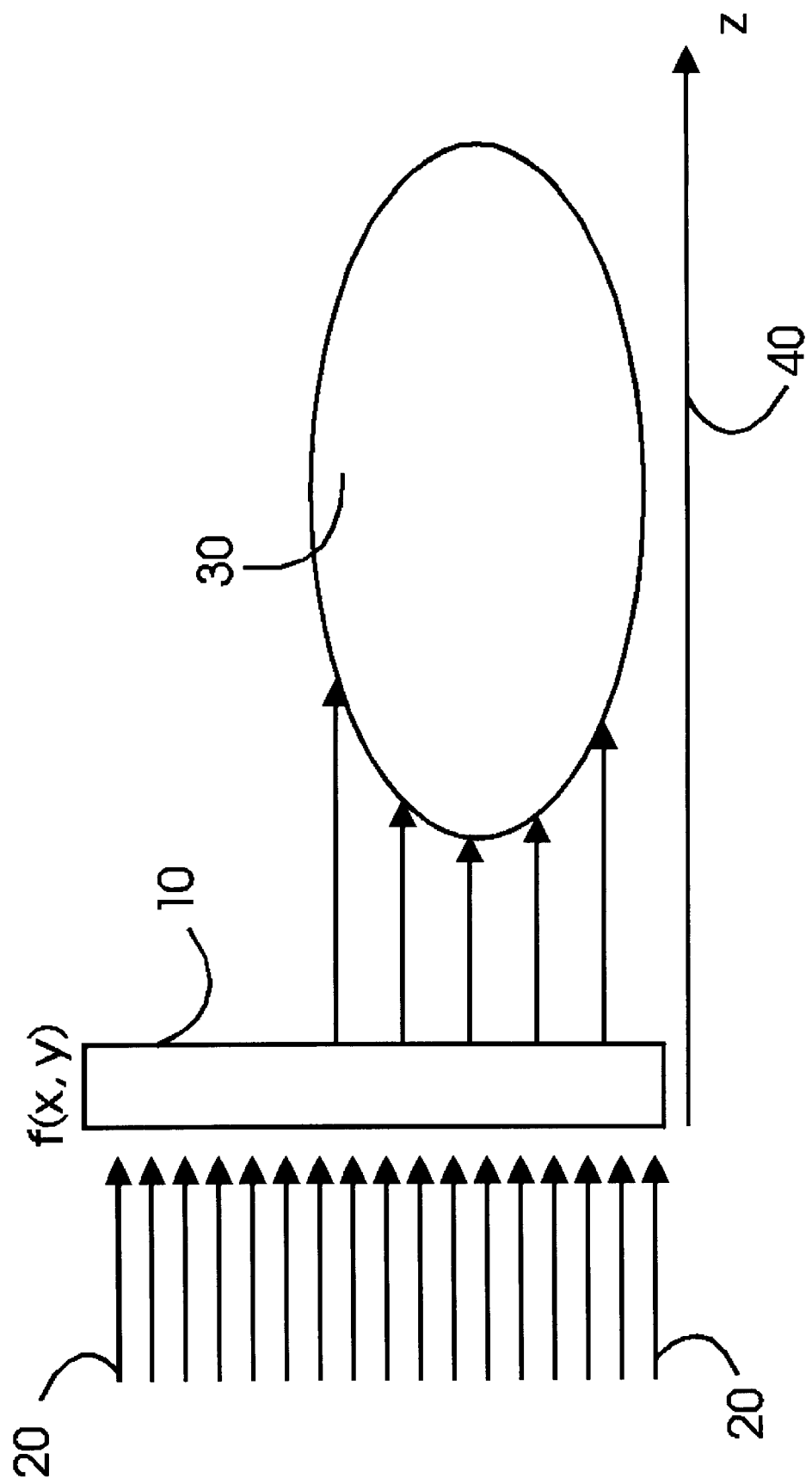
FIG. 1 is a simplified schematic drawing of a diffractive optical element with a two-dimensional light filter being illuminated by an incoming planar light wave normal to the optical element, and producing a three-dimensional light distribution, in accordance with a preferred embodiment of the present invention.

Reference is now made to FIG. 1 which is a simplified schematic illustration of a diffractive optical element 10 with a two-dimensional light filter f(x, y), being illuminated by an incoming planar light wave 20 travelling normal to the optical element, and producing a three-dimensional light distribution 30. It is further assumed that a frame of reference with x, y and z coordinates is oriented so that the planar light wave has coordinates aligned with the reference x and y coordinates, and the transverse reference coordinate, z, runs perpendicular to the planar light wave, as indicated by reference numeral 40.

The three-dimensional light distribution generated when a planar wave illuminates a diffractive optical element having a two-dimensional light filter f(x, y) is given by $(f \circledx h_z)(x, y; z)$, where $h_z(x, y)$ is the impulse response function for free space propagation, and $\circledx$ is the familiar two-dimensional convolution operator. Given a desired target complex-valued three-dimensional light distribution u(x, y, z), corresponding to the light distribution of a desired light beam, a preferred embodiment of the present invention proceeds by minimizing an error functional $$e[f] = \int\int\int |u - f \circledx h|^2 dv. \qquad (1)$$

The term e[f] measures the mean square error between the light distribution generated by the diffractive optical element with filter f(x, y) and the desired target three-dimensional light distribution u. The volume element dv appearing in Equation 1 can be the standard volume element $$dv = dx \cdot dy \cdot dz, \qquad (2)$$

or more generally a weighted volume element $$dv = w(x,y,z) dx \cdot dy \cdot dz, \qquad (3)$$

where w(x, y, z) is a prescribed weight function.

Direct Analytical Derivation of the Optimal Filter f(x, y)

The present invention includes a direct analytical approach for determining an optimal filter f(x, y) in the mean square error sense. It applies to a general situation where one is given an arbitrary three-dimensional light distribution to synthesize. That is, the analytical approach is used to determine a filter f(x, y) for a diffractive optical element, the diffractive optical element being such that an incoming planar wave, when diffracted through the element, generates a light beam that approximates a prescribed three-dimensional light distribution.

The problem of minimizing the error functional e[f] over suitable two-dimensional diffractive optical elements f(x, y) is a familiar type of problem in mathematics referred to as a "projection problem." The particular projection problem at hand is to approximate the three-dimensional distribution u(x, y, z) by a member of the sub-space, S, of functions of the form (f⊗h)(x, y; z). The sub-space S is spanned by the collection of individual functions $h_z$(x−s, y−t), as s and t range over all real values. In a preferred embodiment, the present invention makes use of the property that the optimal choice for the two-dimensional light filter, f, satisfies the "projection condition"

$$\iiint (f \otimes h)(x,y;z) \overline{h}_z(x-s,y-t) dv = \iint u(x,y,z) \text{fheight} \overline{h}_z(x-s,y-t) dv \qquad (4)$$

for each value of s and t, where $\overline{h}$ denotes the complex conjugate of h.

By writing out the two-dimensional convolution term in Equation 4 explicitly, Equation 4 can be re-cast into a linear integral equation $$\iint k(x,y;s,\ t) f(s,t) ds \cdot dt = g(s,t), \qquad (5)$$

where the kernel, k, is given by $$k(x,y;s,t) = \int \{\iint w(a,b,z) h_z(a-s,b-t) \overline{h}_z(a-x,b-y) da \cdot db\} dz, \qquad (6)$$

and the source term, g, is given by $$g(x,y) = \int \{\iint w(s,t,z) u(s,t,z) \overline{h}_z(s-x,t-y) ds \cdot dt\} dz. \qquad (7)$$

If the weight function w(x, y, z) is an indicator function for a set of the form $R^2 \times D$, where D is a prescribed one-dimensional set, then Equation 5 simplifies to the linear convolution-type integral equation $$k \otimes f = g, \qquad (8)$$

where the convolution kernel, k, is given by $$k(x,y) = \int_D \{\iint h_z(s,t) \overline{h}_z(s-x,t-y) ds \cdot dt\} dz, \qquad (9)$$

and the source term, g, is given by $$g(x,y) = \int_D \{\iint u(s,t,z) \overline{h}_z(s-x,t-y) ds \cdot dt\} dz. \qquad (10)$$

Equation 8 admits a solution by application of the Fourier transform. Letting F, $H_z$ and U denote the respective two-dimensional Fourier transforms of f, $h_z$ and u, relative to the x and y coordinates, one arrives at the expression $$F(\mu, \eta) = \frac{\int_D U(\mu, \eta, z) \overline{H}_z(\mu, \eta) dz}{\int_D |H_z(\mu, \eta)|^2 dz}. \qquad (11)$$

For the case where $h_z$ corresponds to the classical Fresnel transfer function, $$h_z(x, y) = \frac{\exp\left(\frac{2\pi z i}{\lambda}\right)}{\lambda z i} \exp\left(\frac{(x^2 + y^2) \pi i}{\lambda z}\right) \qquad (12)$$

its Fourier transform $H_z$ is given by $$H_z(\mu, \eta) = \exp\left(\frac{2\pi i}{\lambda}\right) \exp(-\lambda \pi i (\mu^2 + \eta^2) z), \qquad (13)$$

and Equation 11 reduces to $$F_z(\mu, \eta) = \frac{1}{|D|} \int_D U(\mu, \eta, z) \exp\left(-\frac{2\pi i}{\lambda} z\right) \exp(\lambda \pi i (\mu^2 + \eta^2) z) dz, \qquad (14)$$

where |D| denotes the measure of the one-dimensional set D. Equation 14 provides an explicit solution for the Fourier transform, F, of the filter, f, for the sought after diffractive optical element.

Iterative Generation of the Optimal Filter f(x, y)

The present invention also includes an iterative approach for determining a filter f(x, y). Whereas the analytical approach described hereinabove applies to a general situation where an arbitrary three-dimensional light distribution is prescribed, the iterative approach applies typically to a situation where an intensity profile but not a phase profile is prescribed. That is, the iterative approach is typically used to determine a filter f(x, y) for a diffractive optical element, the diffractive optical element being such that an incoming planar wave, when diffracted through the element, synthesizes a light beam with a prescribed intensity profile.

The iterative approach proceeds in multiple stages, as follows.

Stage 1: Select an initial filter f(x, y).

Stage 2: For a prescribed integer value, N, and N prescribed locations $z_1, \ldots, z_N$, calculate N respective two-dimensional forward planar light distributions $u_j(x, y)$ within transverse planes $z = z_1, \ldots, z = z_N$, according to forward free space propagation from z=0 to $z = z_j$. Specifically, $u_j = f \otimes h_{z_j}$, where $h_z$ is given by Equation (12) above.

Stage 3: Modify the intensities, but not the phases, of each of the respective two-dimensional forward light distributions $u_j(x, y)$ according to constraints $c_j(x, y)$ within a prescribed window, W. Specifically, the modified two-dimensional forward light distributions, $\tilde{u}_j(x, y)$ are given by $$\tilde{u}_j(x, y) = \begin{cases} \alpha c_j(x, y) \exp(i \cdot phase(u_j(x, y))), & (x, y) \in W \\ u_j(x, y) & (x, y) \notin W \end{cases} \qquad (15)$$

where α is an efficiency coefficient that controls the energy inside the window, W.

Stage 4: Calculate the respective back-propagated planar distributions $f_j(x, y)$ from the modified two-dimensional forward light distributions $\tilde{u}_j(x, y)$ according to backward free space propagation from $z=z_j$ to $z=0$. Specifically, $f_j = \tilde{u}_j(x) h_{-z_j}$, where $h_z$ is given by Equation (12) above.

Stage 5: Modify the filter, $f(x, y)$, by averaging the back-propagated planar distributions, $f_j(x, y)$, according to $$f(x, y) = \sum_{j=1}^{N} w_j f_j(x, y), \quad (16)$$

where the terms $w_j$ are weight factors, indicating preferential weights of the transverse planes $z=z_j$. Default values for these weight factors are $w_j=1/N$.

After Stage 5 is complete, the modified filter becomes an approximation to the sought after filter for designing an optimal diffractive optical element. In a preferred embodiment of the present invention, stages 2 through 5 are repeated iteratively. The number of repetitions can be a prescribed number, or alternatively, stages 2 through 5 can be repeated until the iterative sequence of filters $f(x, y)$ generated satisfies a prescribed convergence criterion.

The accuracy of the filters $f(x, y)$ produced in successive iterations of stages 2 through 5 in achieving a desired three-dimensional distribution, depends on the choice of transverse planes $z=z_j$, and on the constraints. If N is large, so that there are many transverse planes, then the filters $f(x, y)$ are more accurate. Similarly, if the constraints $c_j(x, y)$ are close to values consistent with the wave equation, then the filters $f(x, y)$ are more accurate.

Figure 2:
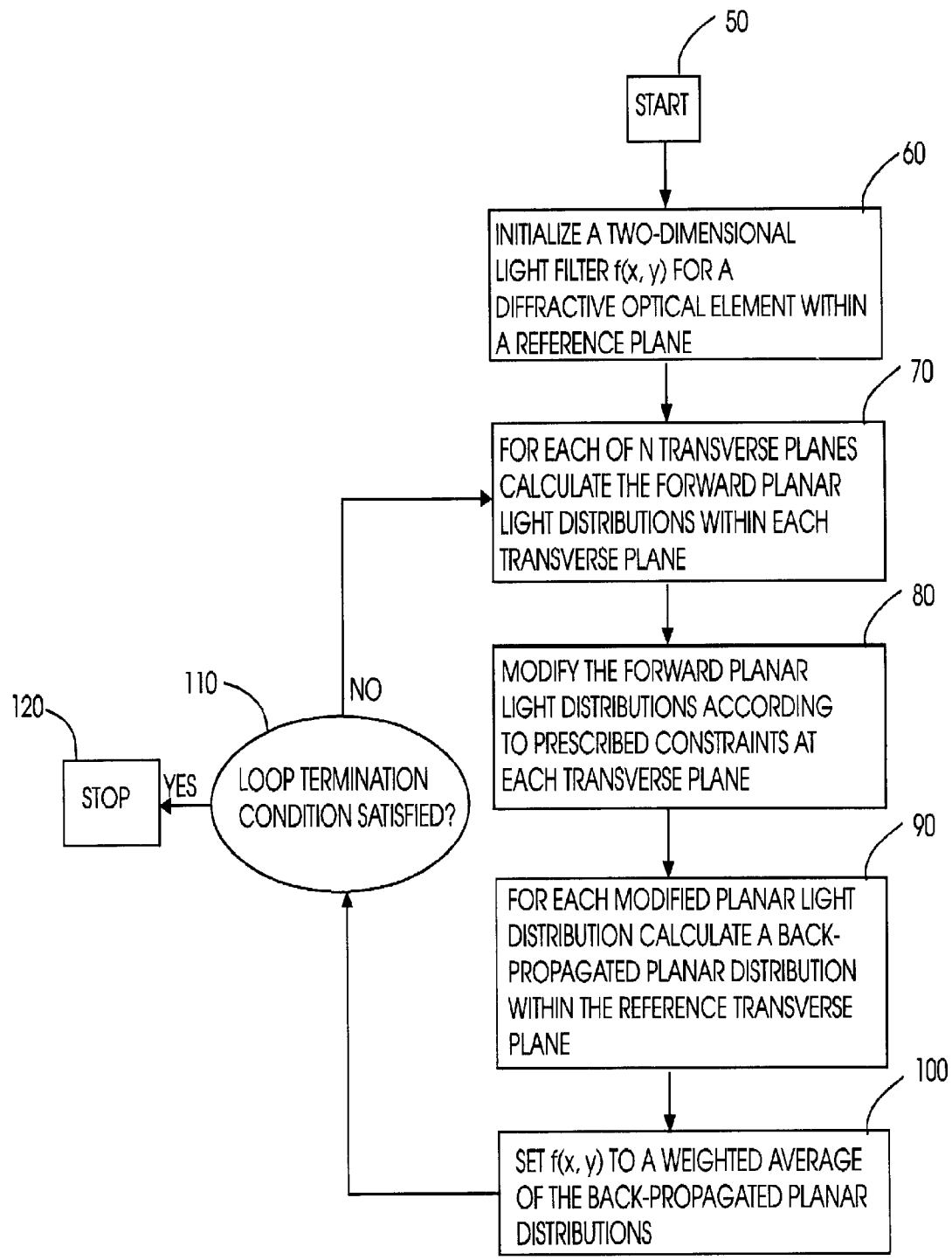
FIG. 2 is a simplified flowchart of an iterative method for calculating a two-dimensional light filter in accordance with a preferred embodiment of the present invention.

Reference is now made to FIG. 2, which is a simplified flowchart of a preferred embodiment of the present invention for calculating a two-dimensional light filter. At step 50 execution begins. At step 60 an initial filter, $f(x, y)$, is chosen for a diffractive optical element within a reference plane. At step 70 forward planar light distributions are calculated for each of N transverse planes, $z=z_1, \ldots, z=z_N$, parallel to the reference plane, according to free space propagation from the reference plane, $z=0$, to the transverse plane $z=z_j$. At step 80 the forward planar light distributions are modified in accordance with prescribed constraints. In a preferred embodiment of the present invention the modifications are applied to the intensities, but not the phase angles, of each of the forward planar light distributions, preferably as indicated by Equation 15 hereinabove. In addition, the modifications are only applied locally within a window, W, of locations (x, y), preferably as indicated by Equation 15 hereinabove.

At step 90 each of the N modified planar light distributions are back-propagated from their respective transverse planes $z=z_j$ to $z=0$, producing back-propagated planar light distributions. At step 100 the filter $f(x, y)$ is set to a weighted average of the back-propagated planar light distributions. At step 110 a loop termination condition is checked. Such a termination condition can be a prescribed number of iterations, or a tolerance condition indicating that successive filter functions $f(x, y)$ are nearly identical. If the loop termination condition is satisfied, then execution stops at step 120. Otherwise, execution returns to step 70, and another iteration begins.

Figure 3:
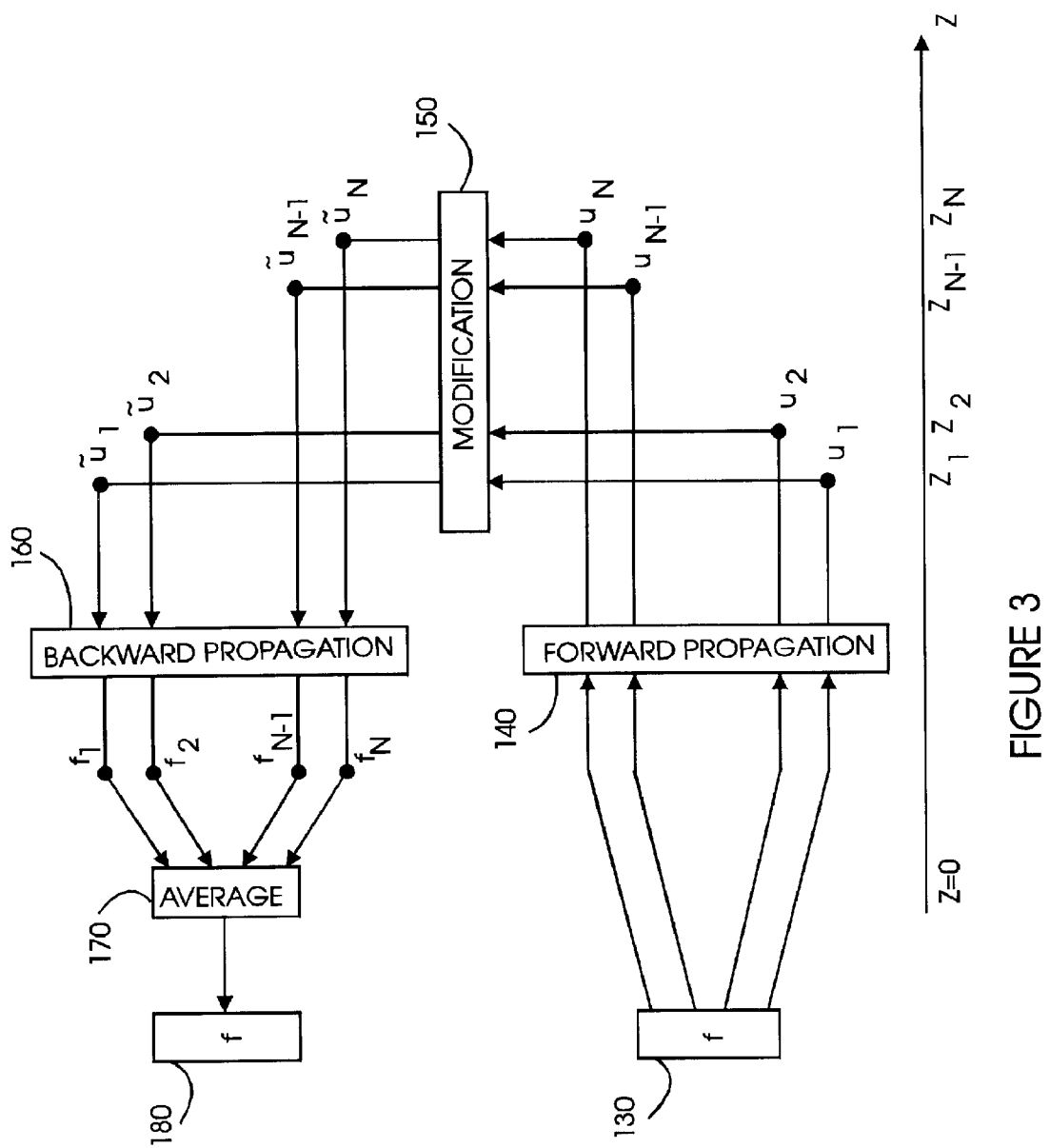
FIG. 3 is a simplified schematic of a system for carrying out a single iteration of the iterative method depicted in FIG. 2 in accordance with a preferred embodiment of the present invention.

Reference is now made to FIG. 3, which is a simplified schematic of a system for carrying out a single iteration of the iterative method depicted in FIG. 2. A diffractive optical element 130 is situated within a reference plane $z=0$, and includes a two-dimensional filter $f(x, y)$ operating within the reference plane. An incoming planar light wave is filtered by diffractive optical element 130 and the resulting planar light distribution is propagated from location $z=0$ to respective locations $z=z_j$ according to forward free space propagation, indicated in the Figure by reference numeral 140. The forward space propagation produces respective planar light distributions $u_j$ within each of the planes $z=z_j$. The planar light distributions $u_j$ are modified by modification unit 150 to form respective modified light distributions $\tilde{u}_j$. Modification unit 150 preferably applies prescribed constraints to the intensities, but not the phases, of light distributions $u_j$.

Modified light distributions $\tilde{u}_j$ are back-propagated from respective planes $z=z_j$ back to reference plane $z=0$, according to backward free space propagation, indicated in the Figure by reference numeral 160. The backward space propagation produces respective light distributions $f_j$. The light distributions $f_j$ are averaged by an averaging unit 170, and the resulting average light distribution is used to update the two-dimensional filter $f(x, y)$. Averaging unit 170 preferably uses weight factors to perform a weighted average, but may also perform a uniform average.

The updated filter $f(x, y)$ is then used within a diffractive optical element 180, and the above operations are iteratively repeated.

Experimental Results

Three computer simulations were performed to validate the present invention, as described hereinbelow. The first two simulations were designed to verify the direct analytical embodiment described hereinabove with reference to Equation 14. The third simulation was designed to verify both the direct analytical embodiment described hereinabove with reference to Equation 14, and the iterative embodiment described hereinabove with reference to FIGS. 2 and 3. All of the simulations indicated advantages of the present invention over the prior art in producing elongated beams that maintain a consistent cross-section over larger distances than conventional beams. The beams produced by the present invention tend to exhibit high side-lobe profiles.

The first simulation used a desired three-dimensional light distribution whose Fourier transform is given by $$U(\mu, \eta, z) = \exp\left(-\frac{\pi}{a^2}(\mu^2 + \eta^2)\right) \cdot \exp\left(i\pi\lambda(\mu^2+\eta^2)\frac{d}{4}\right) \cdot \quad (17)$$
$$\exp\left(i\frac{2\pi}{\lambda}z\right) \cdot \exp\left(-i\pi\lambda(\mu^2+\eta^2)\frac{z}{2}\right),$$

over a region of interest $0 \leq z \leq d$. The values of the parameters were chosen to be $\lambda=0.6328\,\mu m$, $d=4$ m and the scaling parameter $a=6$ mm$^{-1}$. The beam of Equation 17 is a Gaussian beam that diverges slower than a conventional Gaussian beam, by a factor of two.

Reference is now made to FIGS. 4A, 4B and 4C, which illustrate cross-sections of an amplitude profile of a desired beam given by Equation 17, a conventional Gaussian beam and a beam obtained in accordance with a preferred embodiment of the present invention using the analytical method of Equation 14 hereinabove, respectively. The cross-section of the desired beam in FIG. 4A has waists in the middle of the region of interest (z=d/2=2 m). The desired beam illustrated in FIG. 4A diverges slower than the conventional Gaussian beam illustrated in FIG. 4B, by a factor of two. The beam obtained from the present invention, illustrated in FIG. 4C, diverges slower than the conventional Gaussian beam of FIG. 4B, and is a better approximation to the desired beam of FIG. 4A.

The second simulation used a desired three-dimensional light distribution whose Fourier transform is given by $$U(\mu, \eta, z) = L^2 \exp\left(i\frac{2\pi}{\lambda}z\right)\operatorname{sinc}(L\mu)\operatorname{sinc}(L\eta), \quad (18)$$

over a region of interest $0 \leq z \leq d$. The values of the parameters were chosen to be $\lambda=0.6328\,\mu m$, $d=2.5$ m and $L=1.22$ mm. The beam of Equation 18 is a rectangular beam, also referred to as a "top-hat" beam.

Reference is now made to FIGS. 5A and 5B, which illustrate cross-sections of an amplitude profile of a conventional beam having a rectangular aperture in its middle range, and a beam obtained in accordance with a preferred embodiment of the present invention using the analytical method of Equation 14 hereinabove, respectively. The beam illustrated in FIG. 5A coincides with the desired beam given by Equation 18 in the middle of the region of interest ($z=d/2=1.25$ m). It is noted that the conventional beam diverges fast and does not maintain its shape within the region of interest. As can be seen in FIG. 5B, the beam obtained by the present invention better approximates the desired beam than does the conventional beam of FIG. 5A.

The Gaussian beam given by Equation 17 and the top-hat beam given by Equation 18 are of importance in optics, and are commonly used in optical systems. The two simulations described hereinabove demonstrate the ability of the present invention to generate beams approximating the Gaussian and top-hat beams. These simulations further demonstrate the ability to generate beams over a prescribed region of interest.

The third simulation used a three-dimensional light distribution given by $u = u_0 \textcircled{x} h$, where $$u_0(x, y) = \exp\left(-\frac{r^2}{\xi^2}\right) J_0\left(\frac{2\pi\psi r}{\lambda}\right), \quad (19)$$

$J_0$ is the classical zero-th order Bessel function, and r is the polar coordinate $r=\sqrt{x^2+y^2}$. The values of the parameters were chosen to be $\lambda=0.6328\,\mu m$, $\xi=0.956$ mm and $\psi=1.369\times 10^{-3}$.

Figure 6:
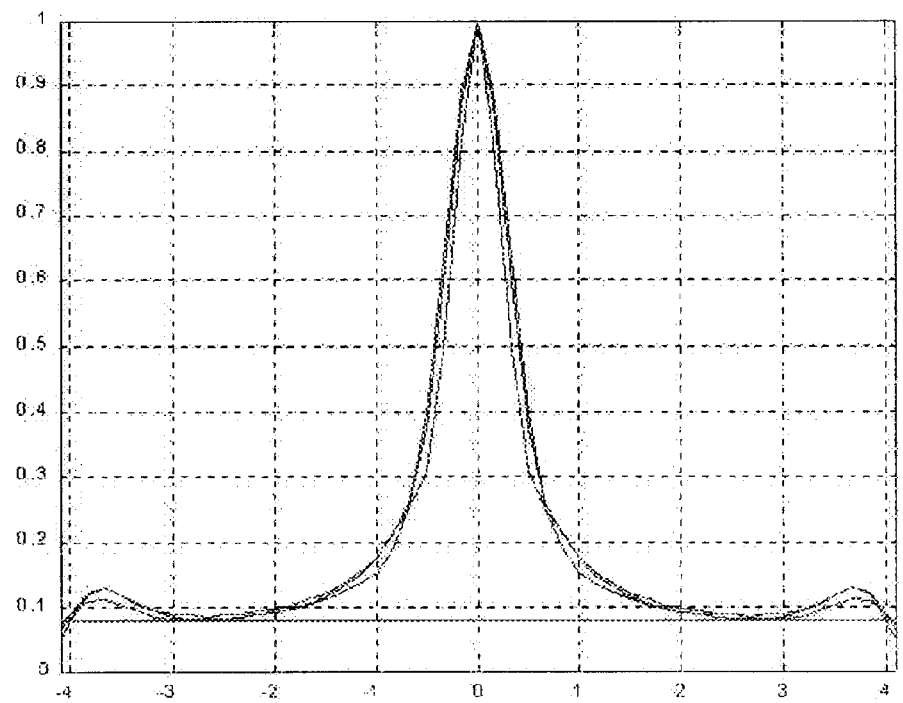
FIG. 6 is an illustration of modulation transfer function profiles of a beam generated using an analytical method in accordance with a preferred embodiment of the present invention.

Reference is now made to FIG. 6, which illustrates modulation transfer function (MTF) profiles of a beam generated by a preferred embodiment of the present invention using the analytical method of Equation 14 hereinabove, that approximates the beam described with reference to Equation 19. It is noted that the beam generated by the present invention can read 4 lines per mm (the horizontal axis) over a distance of 90 cm (the vertical axis) with more than 8% contrast.

Figure 7:
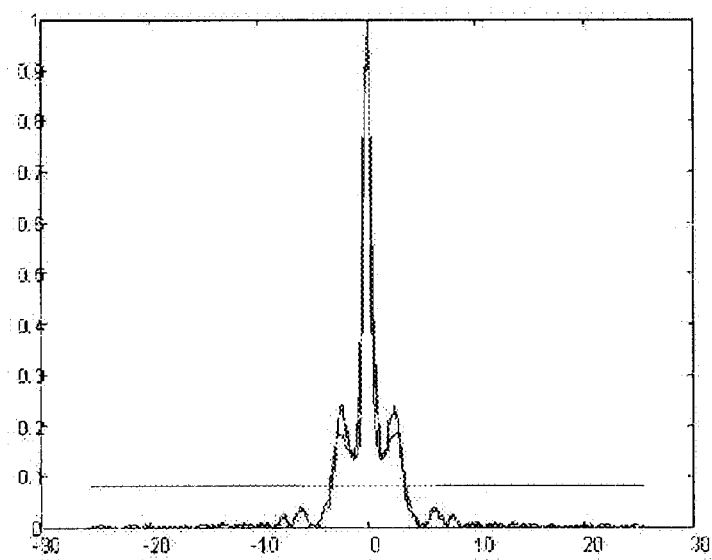
FIG. 7 is an illustration of modulation transfer function profiles of a beam generated using an iterative method in accordance with a preferred embodiment of the present invention.

Reference is now made to FIG. 7, which illustrates modulation transfer function (MTF) profiles of a beam generated by a preferred embodiment of the present invention using the iterative method of FIG. 2 described hereinabove, that approximates the beam described with reference to Equation 19.

It will be appreciated by persons skilled in the art that although the above description refers to diffractive optical elements, the present invention can be used in conjunction with other optical elements that filter incoming light, instead of diffractive optical elements. An optical element implementing a two-dimensional filter determined in accordance with a preferred embodiment of the present invention can be generated in various ways. For example, such an optical element can be a micro-optical element, a refractive element, or a mirror-based element; i.e. an optical element that uses mirrors to filter incoming light.

It will also be appreciated by persons skilled in the art that there is an analogy between free space diffraction of a planar light wave along a transverse axis and temporal dispersion of a linear wave travelling through an optical fiber. As such, the present invention can be used to synthesize time-varying one-dimensional light distributions in optical fibers, that approximate desired time-varying one-dimensional light distributions. Referring again to FIG. 2, if the steps of forward and backward free space propagation are replaced with corresponding steps of forward and backward dispersion along an optical fiber, then the method depicted in FIG. 2 produces a time-varying one-dimensional light distribution for fiber optic transmission having desired properties at multiple exit points along the fiber. Essentially, the spatial (x, y) coordinates of the two-dimensional light filter f(x, y) from elements 60 and 100 become the (t, z) coordinates of a time-varying linear beam, t representing time and z representing distance along the fiber.

It will be further appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for synthesizing a desired light beam comprising:
   calculating a two-dimensional light filter for an optical element, the two-dimensional light filter being such that the optical element produces under free space propagation, in response to illumination thereof, a three-dimensional light distribution that approximates the light distribution of the desired light beam; and
   illuminating the optical element.

2. The method of claim 1 wherein the desired light beam is an elongated focused beam.

3. The method of claim 1 wherein the optical element is a diffractive element.

4. The method of claim 1 wherein the optical element is a micro-optical element.

5. The method of claim 1 wherein the optical element uses mirrors to filter incoming light.

6. The method of claim 1 wherein the optical element is a refractive element.

7. The method of claim 1 wherein the two-dimensional light filter is a phase-only filter.

8. The method of claim 1 wherein the two-dimensional light filter is an amplitude-only filter.

9. The method of claim 1 wherein the two-dimensional light filter is such that the optical element produces under free space propagation, in response to illumination thereof, a three-dimensional light distribution that best approximates the light distribution of the desired light beam with respect to a prescribed error metric, as compared with three-dimensional light distributions produced by other two-dimensional light filters.

10. The method of claim 9 wherein the prescribed error metric is a least squares metric.

11. The method of claim 1 wherein the convolution of the two-dimensional light filter for the optical element with a free space propagation impulse response function approximates the light distribution of the desired light beam.

12. The method of claim 11 wherein the convolution of the two-dimensional light filter for the optical element with a free space propagation impulse response function best approximates the light distribution of the desired light beam with respect to a prescribed error metric, as compared with other two-dimensional light filters.

13. The method of claim 12 wherein the prescribed error metric is a least squares metric.

14. The method of claim 1 wherein said calculating step includes solving a linear integral equation.

15. The method of claim 1 wherein said calculating step uses Fourier transforms to calculate the two-dimensional light filter.

16. The method of claim 1 wherein said calculating step is performed analytically.

17. The method of claim 1 wherein said calculating step is performed by a computer.

18. The method of claim 1 wherein said calculating step comprises:

choosing a candidate two-dimensional light filter for an optical element situated in a reference plane;

deriving a plurality of forward planar light distributions within a respective plurality of transverse planes parallel to the reference plane, by applying forward free space propagation to an incoming light wave transverse to the optical element;

modifying the plurality of forward planar light distributions;

further deriving a plurality of back-propagated planar light distributions by applying backward free space propagation to each of the plurality of modified forward planar light distributions; and producing a modified candidate two-dimensional light filter by taking an average of the plurality of back-propagated planar light distributions.

19. The method of claim 18 wherein the desired light beam is an elongated focused light beam.

20. The method of claim 18 wherein the optical element is a diffractive element.

21. The method of claim 18 wherein the optical element is a micro-optical element.

22. The method of claim 18 wherein the optical element uses mirrors to filter incoming light.

23. The method of claim 18 wherein the optical element is a refractive element.

24. The method of claim 18 wherein the desired light beam is specified by constraints at the plurality of transverse planes, and wherein said modifying step at least partially applies the constraints.

25. The method of claim 24 wherein the constraints are constraints on the intensities of light distributions at the plurality of transverse planes.

26. The method of claim 18 wherein the two-dimensional light filter is a phase-only filter.

27. The method of claim 18 wherein the two-dimensional light filter is an amplitude-only filter.

28. The method of claim 18 wherein said modifying step modifies intensities of the forward planar light distributions without modifying phases of the forward planar light distributions.

29. The method of claim 18 wherein said modifying step modifies the forward planar light distributions at spatial locations within a prescribed set of locations.

30. The method of claim 18 wherein the average of the plurality of back-propagated planar light distributions is a weighted average of the plurality of back-propagated planar light distributions.

31. The method of claim 18 wherein said deriving, modifying, further deriving and producing steps are repeated at least once.

32. The method of claim 18 wherein said deriving, modifying, further deriving and producing steps are repeated a prescribed number of times.

33. The method of claim 18 wherein said deriving, modifying, further deriving and producing steps are repeated until the modified candidate two-dimensional light filters produced at each repetition satisfy a prescribed convergence criterion.

34. The method of claim 1 wherein said illuminating step illuminates the optical element by a planar light wave transverse thereto.

35. A method for synthesizing a desired light beam comprising:

calculating a plurality of phase-only light filters for a respective plurality of optical elements, the plurality of phase-only light filters being such that the plurality of optical elements when mounted in series produce under free space propagation, in response to illumination thereof, a three-dimensional light distribution that approximates the light distribution of the desired light beam; and illuminating the plurality of optical elements.

36. The method of claim 35 wherein the desired light beam is an elongated focused light beam.

37. The method of claim 35 wherein said calculating step applies an algorithm of Gerchberg-Saxton in a Fresnel domain.

38. A system for synthesizing a desired light beam comprising:

a processor calculating a two-dimensional light filter for an optical element, the two-dimensional light filter being such that the optical element produces under free space propagation, in response to illumination thereof, a three-dimensional light distribution that approximates the light distribution of the desired light beam; and an optical element filtering incoming light according to the two-dimensional light filter.

39. The system of claim 38 wherein the desired light beam is an elongated focused light beam.

40. The system of claim 38 wherein said optical element is a diffractive element.

41. The system of claim 38 wherein said optical element is a micro-optical element.

42. The system of claim 38 wherein said optical element uses mirrors to filter incoming light.

43. The system of claim 38 wherein said optical element is a refractive element.

44. The system of claim 38 wherein the two-dimensional light filter is a phase-only filter.

45. The system of claim 38 wherein the two-dimensional light filter is an amplitude-only filter.

46. The system of claim 38 wherein the two-dimensional light filter is such that said optical element produces under free space propagation, in response to illumination thereof, a light distribution that best approximates the light distribution of the desired light beam with respect to a prescribed error metric, as compared with three-dimensional light distributions corresponding to other two-dimensional light filters.

47. The system of claim 38 wherein said processor comprises:

a free space propagation unit applying forward free space propagation to an incoming light wave transverse to an optical element situated in a reference plane, producing a plurality of forward planar light distributions within a respective plurality of transverse planes parallel to the reference plane, and applying backward free space propagation to modified forward planar light distributions, producing a plurality of back-propagated planar light distributions;

a modification unit modifying the plurality of forward planar light distributions, producing the modified forward planar light distributions; and an averaging unit generating an average of the plurality of back-propagated planar light distributions.

48. The system of claim 47 wherein the desired light beam is specified by constraints at the plurality of transverse planes, and wherein said modifying step at least partially applies the constraints.

49. The system of claim 48 wherein the constraints are constraints on the intensities of light distributions at the plurality of transverse planes.

50. The system of claim 47 wherein said modification unit is operational to modify intensities of the plurality of forward planar light distributions, without modifying phases of the plurality of forward planar light distributions.

51. The system of claim 47 wherein said modification unit is operational to modify the plurality of forward planar light distributions at spatial locations within a prescribed set of locations.

52. The system of claim 47 wherein said averaging unit generates a weighted average of the plurality of back-propagated planar light distributions.

53. A system for synthesizing a desired light beam comprising:

a processor calculating a two-dimensional light filter for an optical element, the two-dimensional light filter being such that the optical element produces under free space propagation, in response to illumination thereof, a three-dimensional light distribution that approximates the light distribution of the desired light beam; and a plurality of optical elements with phase-only light filters mounted in series which, when used in combination, filter incoming light according to the two-dimensional light filter.

54. The system of claim 53 wherein the desired light beam is an elongated focused light beam.

55. An elongated focused light beam for use within an optical scanner, made by the process of:

calculating a two-dimensional light filter for an optical element, the two-dimensional light filter being such that the optical element produces under free space propagation, in response to illumination thereof, a three-dimensional light distribution that approximates the light distribution of a desired light beam; and illuminating the optical element.

56. An elongated focused light beam for use within an optical scanner, made by the process of:

calculating a plurality of phase-only light filters for a respective plurality of optical elements, the plurality of phase-only light filters being such that the plurality of optical elements when mounted in series produce under free space propagation, in response to illumination thereof, a three-dimensional light distribution that approximates the light distribution of a desired light beam; and illuminating the plurality of optical elements.

57. An article of manufacture including one or more computer readable media that embody a program of instructions for synthesizing a desired light beam, wherein the program of instructions, when executed by a processor, causes the processor to calculate a two-dimensional light filter for an optical element, the two-dimensional light filter being such that the optical element produces under free space propagation, in response to illumination thereof, a three-dimensional light distribution that approximates the light distribution of the desired light beam.

58. The article of manufacture of claim 57 wherein the one or more computer readable media include one or more non-volatile storage devices.

59. The article of manufacture of claim 57 wherein the one or more computer readable media include a carrier wave modulated with a data signal.

* * * * *